US009360871B1

(12) United States Patent
Jorgensen

(10) Patent No.: US 9,360,871 B1
(45) Date of Patent: Jun. 7, 2016

(54) INTEGRATED FLUID FLOW MANAGEMENT APPARATUS

(71) Applicant: Charles Jorgensen, Kansas City, MO (US)

(72) Inventor: Charles Jorgensen, Kansas City, MO (US)

(*) Notice: Subject to any disclaimer, the term of this patent is extended or adjusted under 35 U.S.C. 154(b) by 0 days.

(21) Appl. No.: 14/877,005

(22) Filed: Oct. 7, 2015

(51) Int. Cl.
*G06F 19/00* (2011.01)
*G05D 7/06* (2006.01)
*F16K 31/06* (2006.01)

(52) U.S. Cl.
CPC .......... *G05D 7/0635* (2013.01); *F16K 31/0644* (2013.01)

(58) Field of Classification Search
CPC ................. G05D 7/0635; F16K 31/0644
USPC .......................................... 700/282
See application file for complete search history.

(56) References Cited

U.S. PATENT DOCUMENTS

| 5,078,172 | A | 1/1992 | Golzalez | |
|---|---|---|---|---|
| 5,129,619 | A * | 7/1992 | Castetter | F16K 31/086 137/487 |
| 5,129,620 | A * | 7/1992 | Castetter | F16K 31/086 137/486 |
| 5,441,070 | A | 8/1995 | Thompson | |
| 6,900,737 | B1 | 5/2005 | Ardalan et al. | |
| 7,308,824 | B2 | 12/2007 | Trescott, Jr. et al. | |
| 7,362,230 | B1 * | 4/2008 | Fish | G01M 3/04 340/500 |
| 7,443,313 | B2 | 10/2008 | Davis et al. | |
| 7,768,412 | B2 * | 8/2010 | Vokey | G08B 21/20 340/521 |
| 7,768,424 | B2 | 8/2010 | Harvey et al. | |
| 7,926,138 | B2 * | 4/2011 | Lee | D06F 39/081 8/158 |
| 8,072,340 | B2 * | 12/2011 | Yukawa | G01M 3/2815 340/605 |
| 8,079,412 | B2 * | 12/2011 | Short | E21B 33/037 166/81.1 |
| 8,402,984 | B1 * | 3/2013 | Ziegenbein | E03B 7/071 137/15.11 |
| 8,439,062 | B1 * | 5/2013 | Ziegenbein | F17D 5/02 122/507 |
| 8,489,342 | B2 | 7/2013 | Dugger et al. | |
| 8,665,101 | B2 * | 3/2014 | Solomon | G01M 3/243 340/605 |
| 2006/0174707 | A1 * | 8/2006 | Zhang | G01M 3/243 73/592 |
| 2006/0191323 | A1 * | 8/2006 | Garabedian | F16D 5/06 73/40 |
| 2011/0298635 | A1 | 12/2011 | Yip | |
| 2012/0132300 | A1 | 5/2012 | Hanif | |
| 2014/0316590 | A1 * | 10/2014 | Stenberg | F04B 43/0081 700/282 |
| 2015/0032252 | A1 * | 1/2015 | Galluzzo | B25J 5/007 700/218 |
| 2015/0247584 | A1 * | 9/2015 | Singley | F03C 1/00 251/69 |

OTHER PUBLICATIONS

Hunaidi, Osama. Detecting leaks in water distribution pipes. vol. 40. Institute for Research in Construction, National Research Council of Canada, 2000.*

(Continued)

*Primary Examiner* — Michael D Masinick
(74) *Attorney, Agent, or Firm* — Dale J. Ream

(57) ABSTRACT

An integrated fluid flow apparatus for managing the flow of a fluid through a conduit, includes a flow sensor configured to determine a velocity of a fluid flowing through the conduit. The apparatus includes a valve assembly positioned inline with the conduit that is movable between open and closed configurations. An electromagnet is selectively energized by a power source and situated proximate the valve assembly. A closure assembly is operatively coupled to the valve assembly and is magnetically connected to the electromagnet. The closure assembly holds the valve assembly to the open configuration when also magnetically connected to the electromagnet and moves the valve assembly to the closed configuration when the magnetic coupling is released. The apparatus includes a communications module that communicate with a homeowner or resident concerning water velocity, temperature, seismic activity, that the valve has been closed, and to solicit instructions on selected actions.

29 Claims, 19 Drawing Sheets

(56) References Cited

OTHER PUBLICATIONS

Suh, Changsu, and Young-Bae Ko. "Design and implementation of intelligent home control systems based on active sensor networks." Consumer Electronics, IEEE Transactions on 54.3 (2008): 1177-1184.*

Britton, T., et al. "Remote diagnosis of leakage in residential households." Journal of Australian Water Association 35.6 (2008): 89-93.*

* cited by examiner

INTEGRATED FLUID FLOW MANAGEMENT APPARATUS

BACKGROUND OF THE INVENTION

This invention relates generally to fluid flow devices and, more particularly, to a "smart" fluid flow apparatus for use in managing fluid flow through a conduit and having remote shut off via wireless communication, manual shutoff, and a failsafe valve closure assembly with battery backup.

Broken or damaged water lines cause more damage to homes than any other household events. One break can flood an entire home. Frozen water lines in homes while owners are away are also a big problem as nobody knows a water line is broken for weeks. Seismic activity from an earthquake also has the potential to cause a broken line and, again, a flooded basement. Even if a homeowner has notice of a water leak inside the house, finding the main shutoff valve may be very difficult to find and operate. In addition, a leaking pipe in a residence can be a disaster because a homeowner, whether home or away, may be unaware of it.

Various devices and patent proposals are known which monitor the flow of water through a pipe so as to determine if fluid is flowing normally and report data to a user, such as through a display on the monitoring apparatus or even through remote communications. Although presumably effective for their intended purposes, the existing devices and systems for monitoring fluid flow do not fully integrate monitoring fluid flow by comparison with a flow history record, with temperature, seismic, and moisture-on-the-floor sensors, and with a communications module that wirelessly notifies a home owner of fluid flow irregularities and receives instructions from the notified homeowner regarding whether to close flow from the fluid conduit.

Therefore, it would be desirable to have a fluid flow management apparatus that provides solutions to each of the disadvantages of the prior art described above.

SUMMARY OF THE INVENTION

An integrated fluid flow apparatus for managing the flow of a fluid through a conduit, such as a residential water line, according to the present invention includes a fluid flow sensor situated in a housing operatively coupled to the conduit. The fluid sensor is configured to determine a velocity of a fluid flowing through the conduit, such by sending a signal through the conduit and collecting a reflected signal. The apparatus includes a valve assembly positioned inline with the conduit, the defining an inlet, an outlet, and an interior area therebetween, the valve assembly being movable between an open configuration that allows the fluid to flow through the outlet of the valve assembly and a closed configuration that prevents the fluid from flowing through the outlet. An electromagnet is electrically connected to and selectively energized by the power source and situated proximate the valve assembly.

A closure assembly includes a first lever portion operatively coupled to the valve assembly and a second lever portion extending away from the valve assembly and is selectively magnetically connected to the electromagnet. The closure assembly holds the valve assembly at the open configuration when the second lever portion is magnetically connected to the electromagnet and moves the valve assembly to the closed configuration when the second lever portion is magnetically released from the electromagnet. In another aspect, the fluid flow apparatus includes a communications module that enables a processor to communicate with a homeowner or resident concerning the state of the apparatus and to solicit instructions on selected actions.

The integrated computerized flow meter and shutoff valve learns the water use pattern of a structure over and extended period time. In an embodiment, the period of time may be continual learning and updating. When the fluid flow meter detects variations it immediately and automatically notifies the owners via email or through an integrated mobile or internet app which could tie into other home automation. The notice would give an option to shut off water to the house via the integrated valve assembly or to ignore (if the owners are filling a pool or have known variations in water use). The valve is controlled by connection to an electromagnet and has an optional battery backup. Settings would be designed to allow owners to have the valve shut after a period of time if no response is received from the warning. The owner would be able to open or close the valve remotely as needed for convenience.

In the case of power failure, if the device detects an issue it can be programmed to automatically shut off water. If integrated into home automation, a low temperature (due to heat failure) can trigger an automatic shutoff. As a fail-safe the valve is electromagnetically held open such that the valve would automatically close if electrical power and the battery backup fail.

Therefore, a general object of this invention is to provide an integrated fluid flow apparatus for managing the flow of a fluid through a conduit such as a residential water pipe.

Another object of this invention is to provide an integrated fluid flow apparatus, as aforesaid, having a fluid flow meter under processor control for monitoring and analyzing fluid flow and alerting a homeowner of irregularities so that the homeowner can decide whether or not to initiate a valve closure.

Still another object of this invention is to provide an integrated fluid flow apparatus, as aforesaid, having temperature, seismic, and floor wetness sensors for determining if the valve assembly should be closed.

Yet another object of this invention is to provide an integrated fluid flow apparatus, as aforesaid, having a valve assembly that is magnetically coupled to an electromagnet and configured to close a valve immediately if the electromagnet is de-energized (such as during a power loss).

A further object of this invention is to provide an integrated fluid flow apparatus, as aforesaid, having a communications module capable of contacting a homeowner, such as via a mobile device, regarding the status of the fluid flow and other sensors and, then, to receive a reply with directions regarding closure.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from FIG. 2a;

FIG. 3 is an exploded view of the apparatus of FIG. 2a;

FIG. 9b is a front view of the valve assembly as in FIG. 9a;

FIG. 9c is a side view of the valve assembly as in FIG. 9a;

FIG. 10b is a front view of the closure assembly as in FIG. 10a;

FIG. 10c is a side view of the closure assembly as in FIG. 10a;

FIG. 12b is a side view of the electromagnet as in FIG. 12a;

FIG. 13b is a side view of the tension spring as in FIG. 13a;

FIG. 14b is a side view of the tension spring as in FIG. 14a;

FIG. 15b is a front view of the rails as in FIG. 15a;

FIG. 15c is a side view of the rails as in FIG. 15a;

DESCRIPTION OF THE PREFERRED EMBODIMENT

Figure 1:
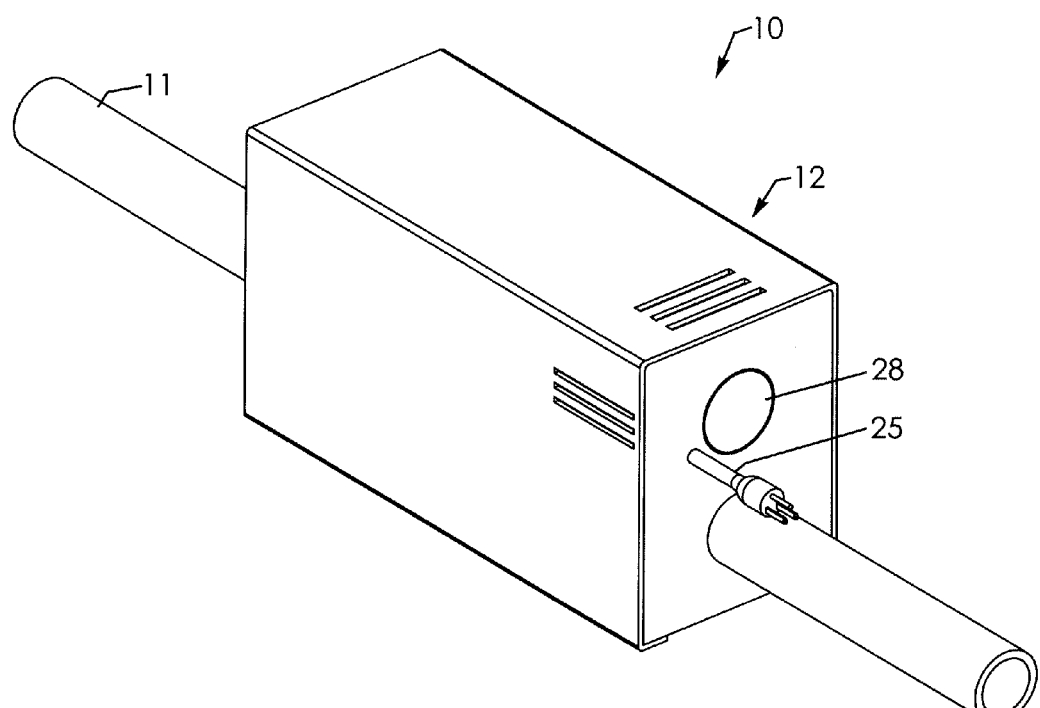
FIG. 1 is a perspective view of an integrated fluid flow apparatus according to a preferred embodiment of the present invention installed about a fluid conduit.

An integrated fluid flow apparatus for managing the flow of a fluid through a conduit according to a preferred embodiment of the present invention will now be described with reference to FIGS. 1 to 20 of the accompanying drawings. The fluid flow apparatus 10 includes a fluid flow sensor 32, a valve assembly 40, an electromagnet 30, a closure assembly 17, and a communications module 60. The fluid flow apparatus 10 is for use with a conduit 11, such as an incoming residential water pipe in the basement of a house although the apparatus 10 may be used with a commercial water line and with other fluid lines such as gas lines, swimming pool lines, irrigation lines, and the like.

The fluid flow apparatus 10 includes a housing 12 having walls that together define an interior space in which the many components described below are housed. The housing may include a framework 14 having internal shelves or walls to which various components may be mounted adjacent and proximate the conduit 11. The housing 12 is configured to be coupled about a fluid conduit 11 and, in order to surround the conduit 11, may include one or more panels that are selectively removable. One or more removable panels are also advantageous to reveal and provide access to the components, especially a touch screen input and display device 36 as will be described in more detail later.

In one embodiment, the fluid flow apparatus 10 includes a memory 20 having data structures for storing data and programming instructions. A processor 22 is in data communication with the memory 20 and with a power source 24. The power source 24 may be connected via an electrical cord 25 to a traditional 110 volt AC power supply such as a wall outlet. The apparatus 10 may also include a backup battery 26 positioned in the housing 12 and electrically connected to the processor 22 and other components as well. An LED light 28 may be positioned on the front of a housing panel and electrically connected to the processor 22. The processor 22 is configured to energize the light 28 so long as electrical current is being supplied to an electromagnet 30, i.e. to indicate the apparatus 10 is operational.

The fluid flow apparatus 10 includes a fluid flow sensor 32 that is positioned adjacent the conduit 11 when the housing 12 is mounted thereto. The fluid flow sensor 32 may be positioned in a flow sensor housing 12 that surrounds the conduit 11 and may extend inline into the conduit 11. The fluid flow sensor 32 may include transducers or the like that reflect a signal into the flow of a fluid in the conduit 11 (e.g. water), collect returned reflected signals, and calculate the velocity or volume of the fluid flowing therethrough. The fluid flow data collected over a period of time may be delivered to a processor 22 and the processor, directed by programming stored in memory 20, calculates the velocity at predetermined times of a day or week and tracks and stores the data in memory 20 as a "flow history record." Use of this data will be described later in greater detail.

The fluid flow apparatus 10 includes a valve assembly 40 positioned inline with the conduit 11. More particularly, the valve assembly 40 may include a ball valve housing 12 in the form of a plumbing fitting that is situated inline to the conduit, the ball valve housing 12 having a generally round or bulbous configuration that defines an inlet, an outlet 44, and an interior area. The valve assembly 40 includes a valve, such as a ball valve 42, situated in the interior area of the ball valve housing 12 and is movable (by operation of a closure assembly 17 described below) between an open configuration that allows fluid entering through the inlet to flow on through the outlet 44 and a closed configuration preventing fluid from flowing through the outlet 44.

The closure assembly 17 is operatively coupled to the valve assembly 40 and configured to selectively move the valve 42 between the open and closed configurations as will now be described in more detail. Viewed generally, the closure assembly 17 acts as a lever—moving pivotally relative to the valve housing 12. As the closure assembly 17 is moved, the valve 42 inside the valve housing 12 is moved. More particularly, the closure assembly 17 includes a first lever portion 17 having ends extending through opposed walls of the valve housing 12 and coupled to the ball valve 42. A second lever portion 18 extends away from the first lever portion 17 and valve housing 12. A free end of the second lever portion 18 may have a metallic or magnetic construction as will become apparent later.

An electromagnet 30 is mounted to the framework 14 within the interior space of the housing 12. The electromagnet 30 is electrically connected to the processor 22 and, therefore, to the power source 24. When energized by the power source, the electromagnetic applies a powerful magnetic force but is configured to release any magnetically attracted objects from its attraction when not energized. As described above, the free end of the second lever portion 18 of the closure assembly 17 is magnetically coupled to the electromagnet 30 when it is energized but is released therefrom when not energized. By the structure of the closure assembly 17 described above, the valve 42 is normally held at the open configuration when the electromagnet 30 is energized and the free end of the second lever portion 18 is magnetically coupled thereto.

When the electromagnet 30 is not energized, whether due to a power loss or by the processor 22 as will be described later, the free end of the second lever portion 18 is pushed away therefrom and this movement causes the valve assembly 40 to move to the closed configuration.

More particularly, at least one tension spring 19 is provided to cause the upper end to be proactively pulled away from the electromagnet when not energized. The tension spring 19 includes a first end 19a coupled to the framework of the housing 12 or to an anchor member 19c mounted thereto. The spring 19 includes an opposed second end 19b that is coupled to the second lever portion 18 of the closure assembly 17. It is understood that a tension spring is normally biased to retract itself to an unextended or tightly contracted state.

Accordingly, the tension spring 19 normally applies a pulling force on the second lever portion 18. However, the second lever portion 18 is normally magnetically attracted to the electromagnetic and is held securely to it in magnetic attraction. That is, until electrical power is lost from the electromagnet 30 or the electromagnet 30 is intentionally de-energized in which case the second lever portion 18 is released and free to be pulled away by way of the tension spring 19. In fact, the second lever portion 18 may be pivotally rotated rearwardly to a resting point in contact with a stop 13 atop the conduit 11. A pivotal movement of the closure assembly 16 upon release from the electromagnet 30 moves the ball valve 42 to the closed configuration and fluid is prevented from passing through the outlet 44 of the valve assembly 40.

In one embodiment, however, the second lever portion 18 may not be immediately released from the electromagnet 30 even when it is de-energized. In this embodiment, a backup battery 26 may be positioned within the housing 12 and is electrically connected to the processor 22, electromagnet 30, or tied into the main power circuitry. In operation, when the main power source fails to provide current to the electromagnet 30, the current from the backup battery 26 may be allowed to flow instantly to the electromagnet 30 such that the closure assembly 16 is not released. Of course, in instances where the processor 22 intentionally directs the electromagnet 30 to be de-energized (and to release the closure assembly 16), the backup battery 26 may be overridden and prevented from providing instant emergency power.

When the main power supply is restored or when the processor 22 directs for a reset of the system, the closure assembly 16 needs to be moved in an opposite direction such that the second lever portion 18 is again magnetically coupled to the electromagnet 30. This restoration is no trivial matter in that the tension spring 19 is powerful and its force must be overcome, such as with a motor, manually, or another technology. In one embodiment, one or a pair of magnetic rails 34 are situated in the housing and specifically positioned to urge the closure assembly 16 (particularly the second lever portion thereof) back into contact with the electromagnet 30.

Figure 2A:
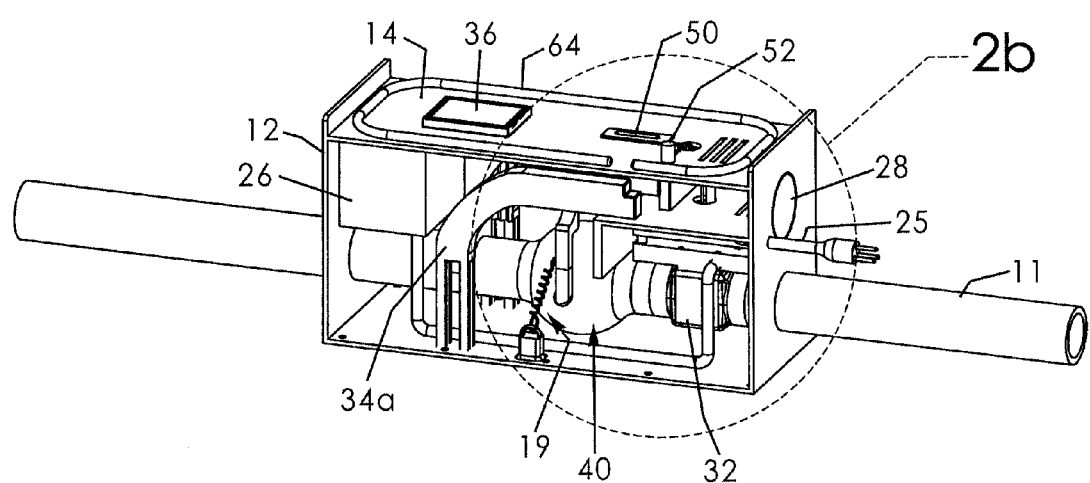
FIG. 2a is a perspective view of the apparatus as in FIG. 1 with top and side panels removed.
Figure 2B:
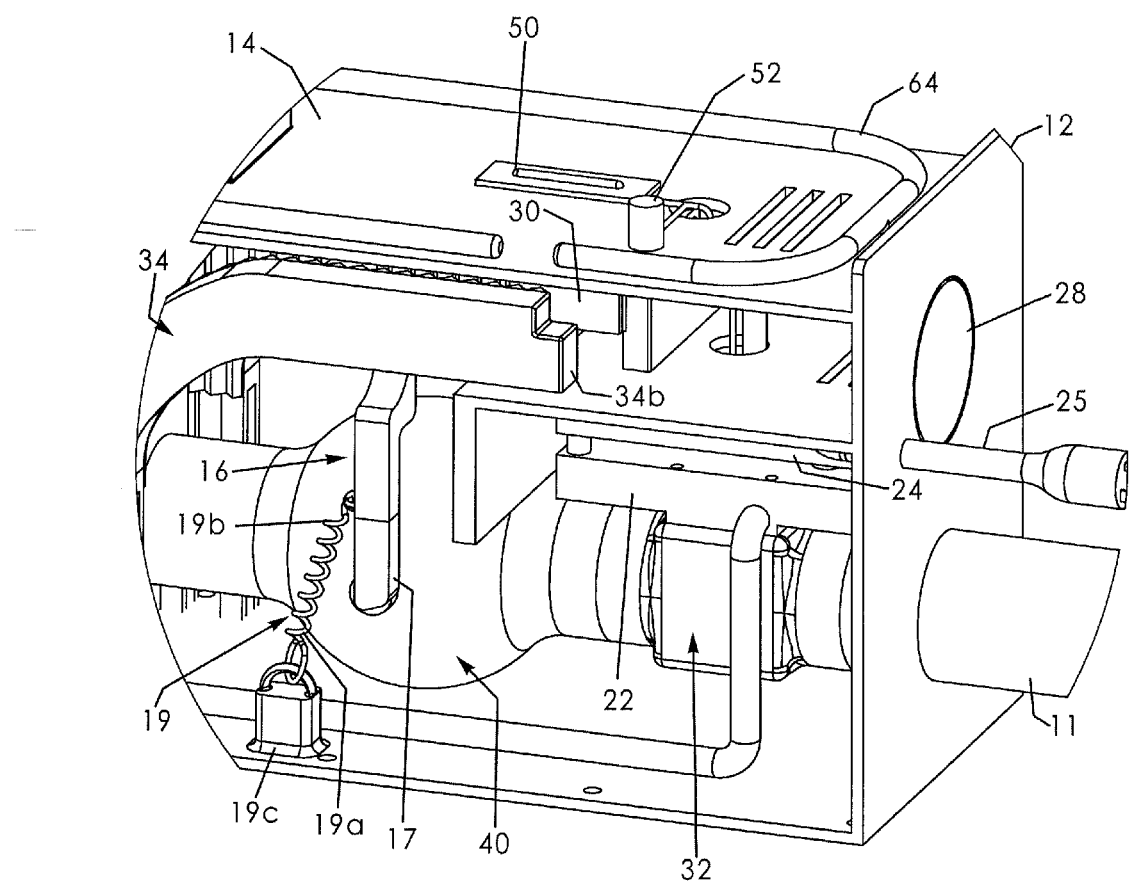
Figure 3:
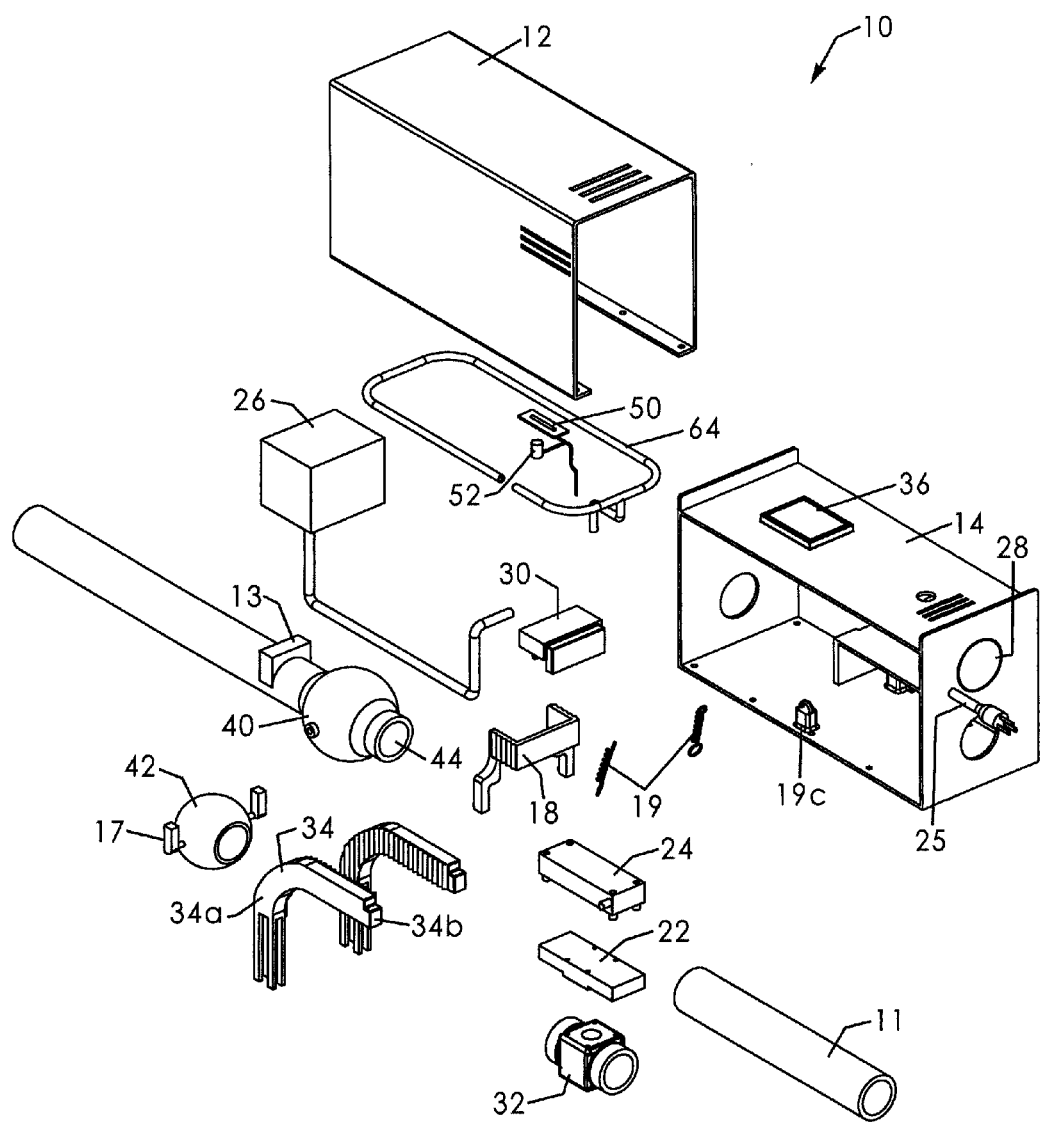
Figure 4:
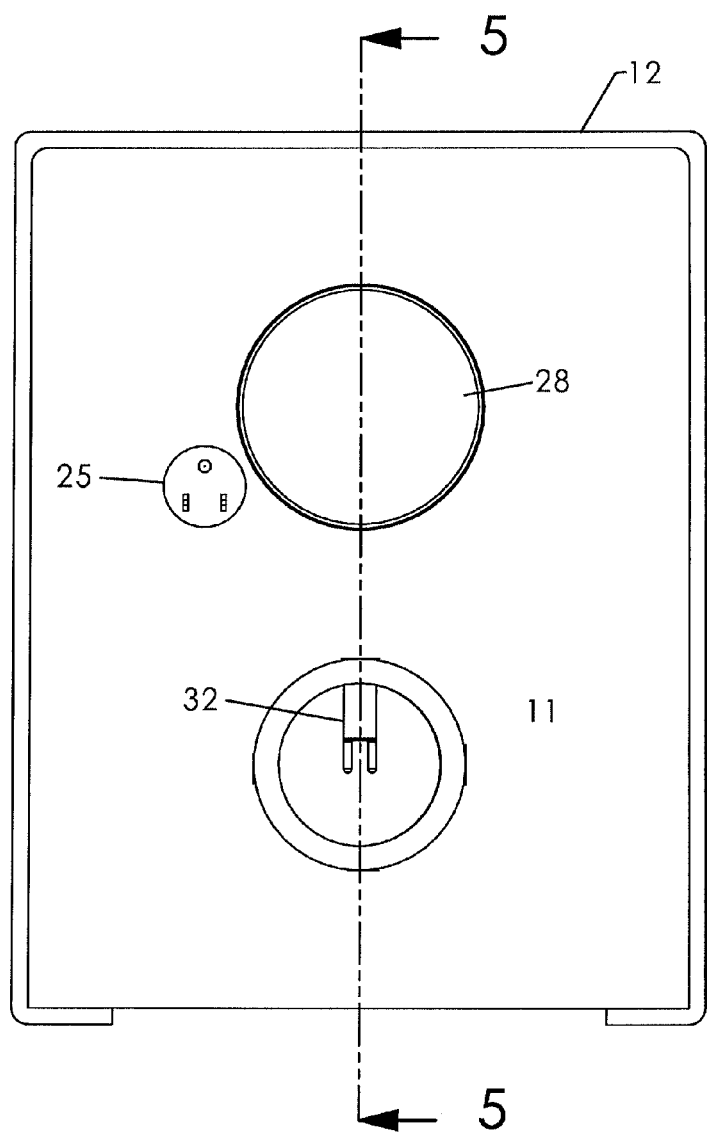
FIG. 4 is a front view of the apparatus as in FIG. 1.
Figure 5:
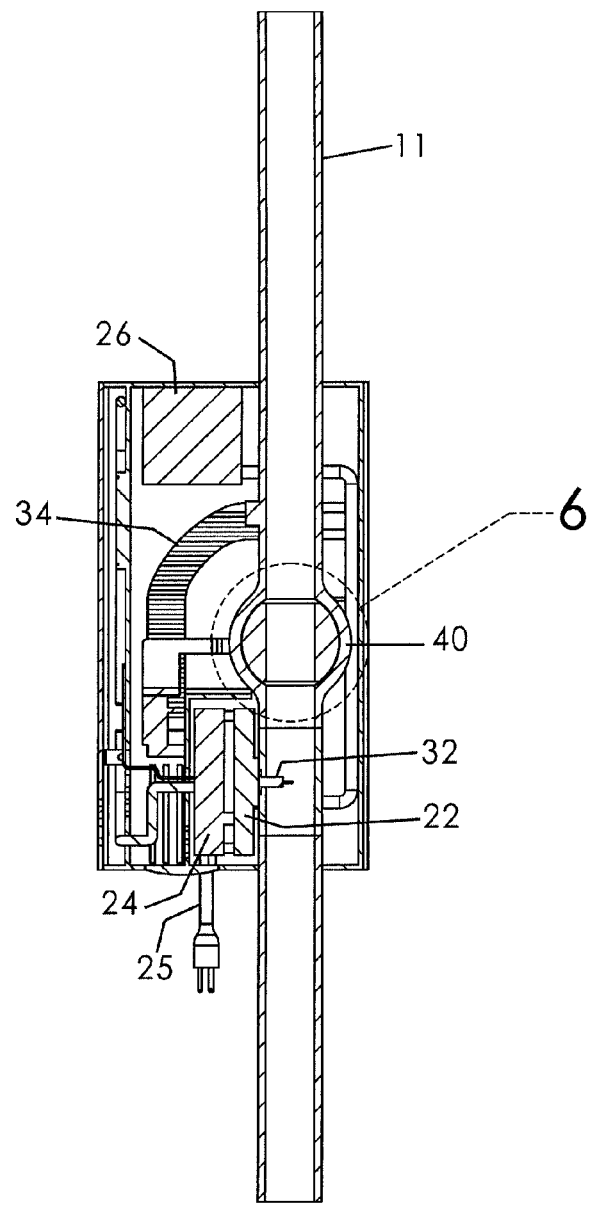
FIG. 5 is a sectional view taken along line 5-5 of FIG. 4.
Figure 6A:
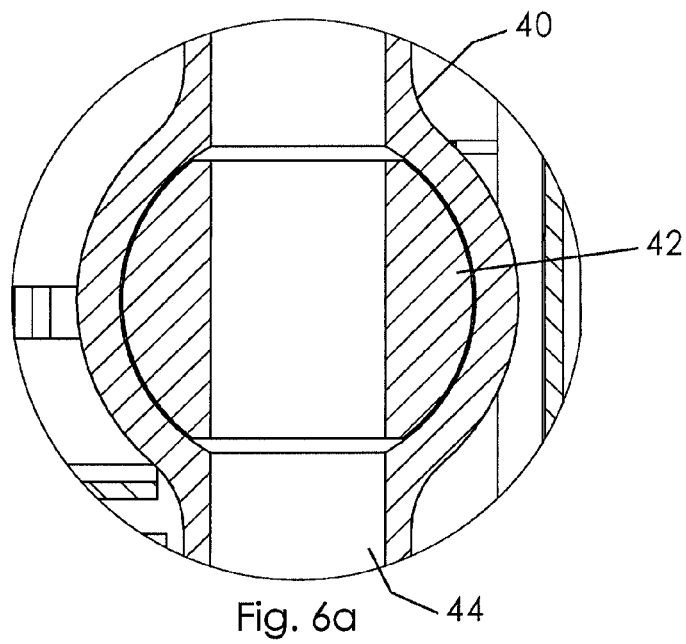
FIG. 6a is an isolated view on an enlarged scale taken from FIG. 5 illustrating a valve in an open configuration.
Figure 6B:
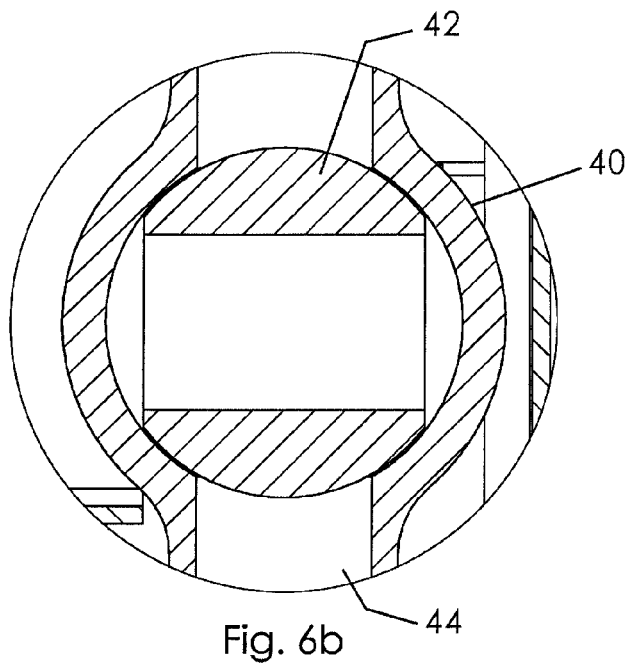
FIG. 6b is an isolated view on an enlarged scale taken from FIG. 5 illustrating a valve in a closed configuration.
Figure 7:
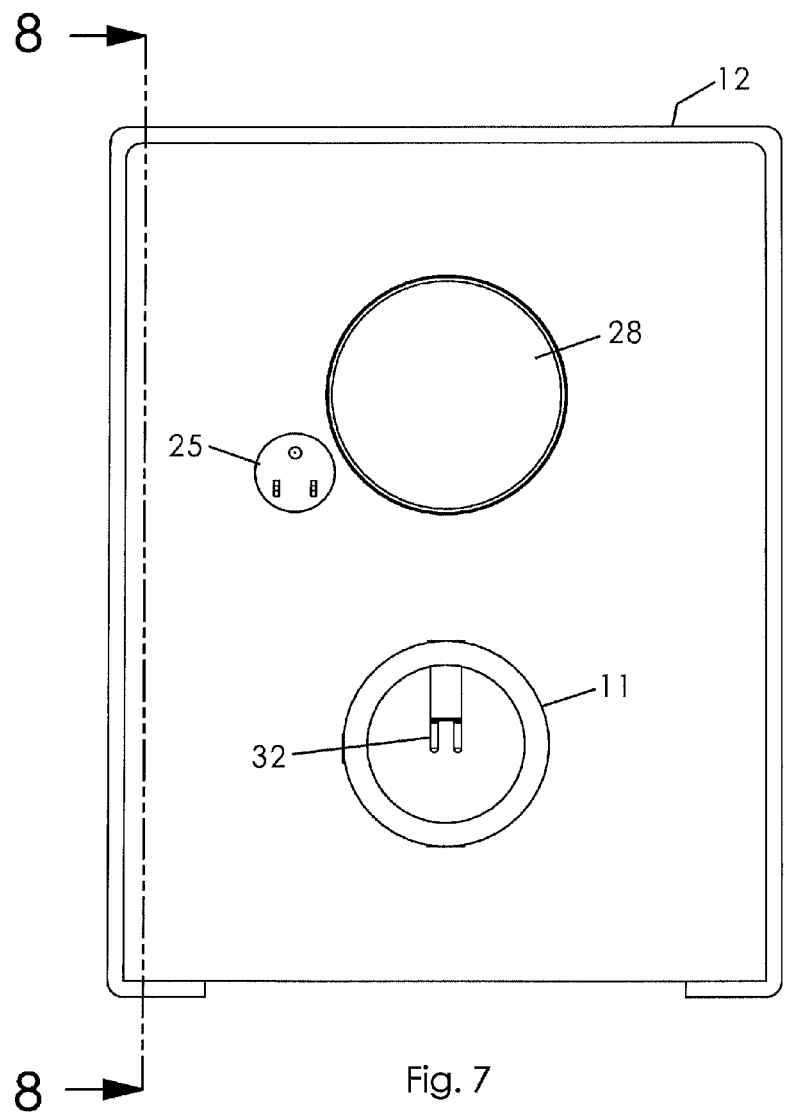
FIG. 7 is another front view of the apparatus as in FIG. 1.
Figure 8A:
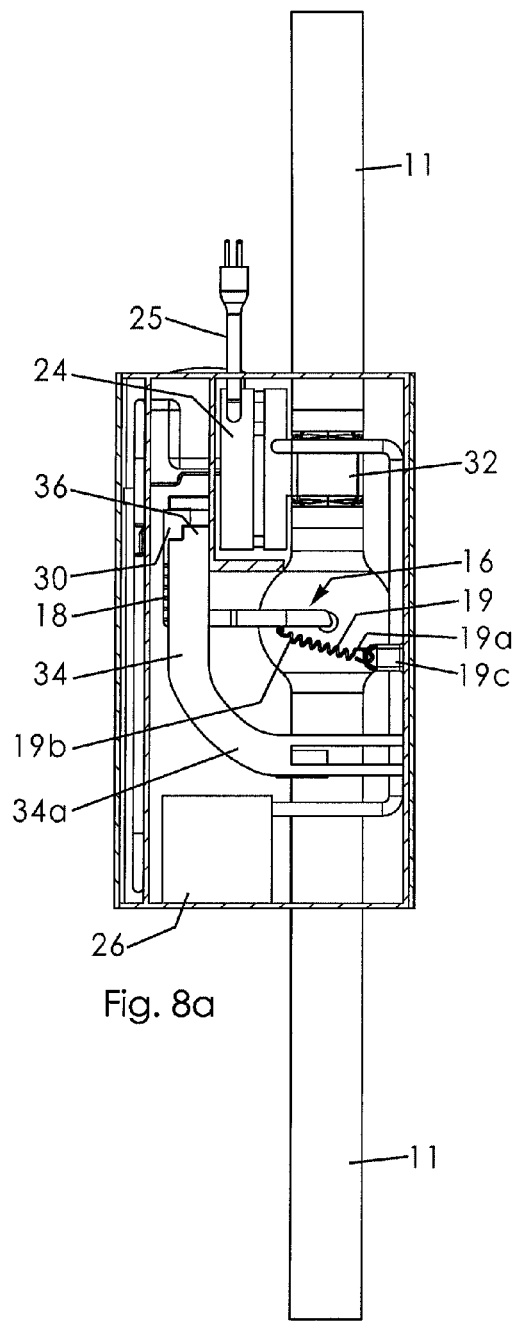
FIG. 8a is a sectional view taken along line 8a-8a of FIG. 7 illustrating the springs of the closure assembly in an extended configuration.
Figure 8B:
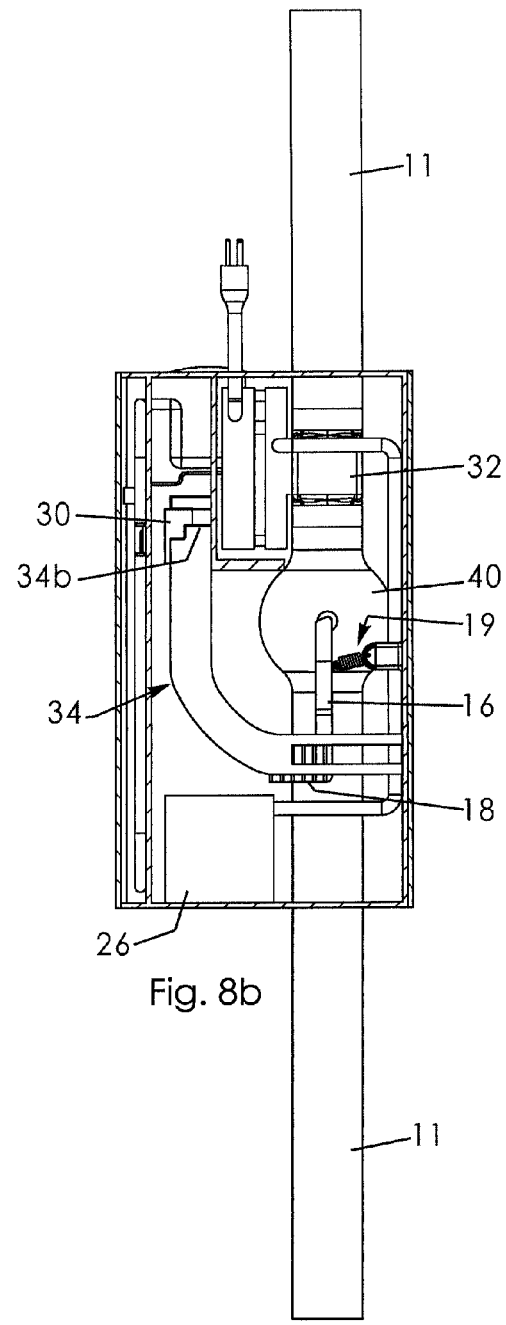
FIG. 8b is a sectional view taken along line 8a-8a of FIG. 7 illustrating the springs of the closure assembly in an unextended or relaxed configuration.
Figure 10A:
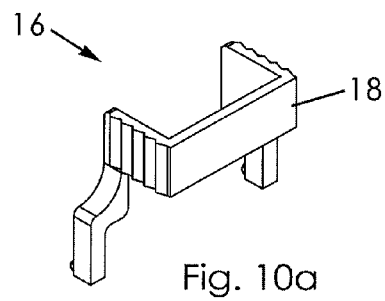
FIG. 10a is a perspective view of the closure assembly of FIG. 3.
Figure 10B:
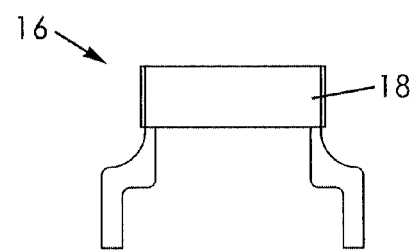
Figure 10C:
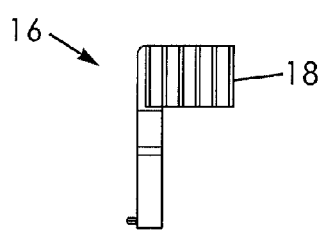
Figure 9A:
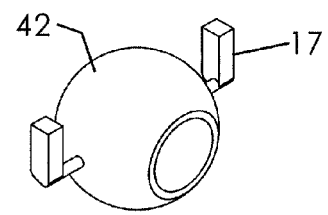
FIG. 9a is a perspective view of a valve assembly of the present invention.
Figure 9C:
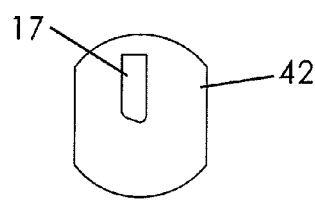
Figure 9B:
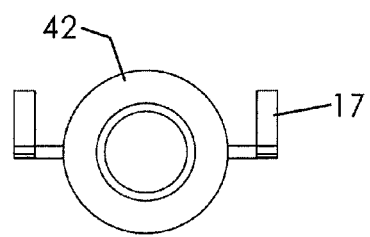
Figure 11:
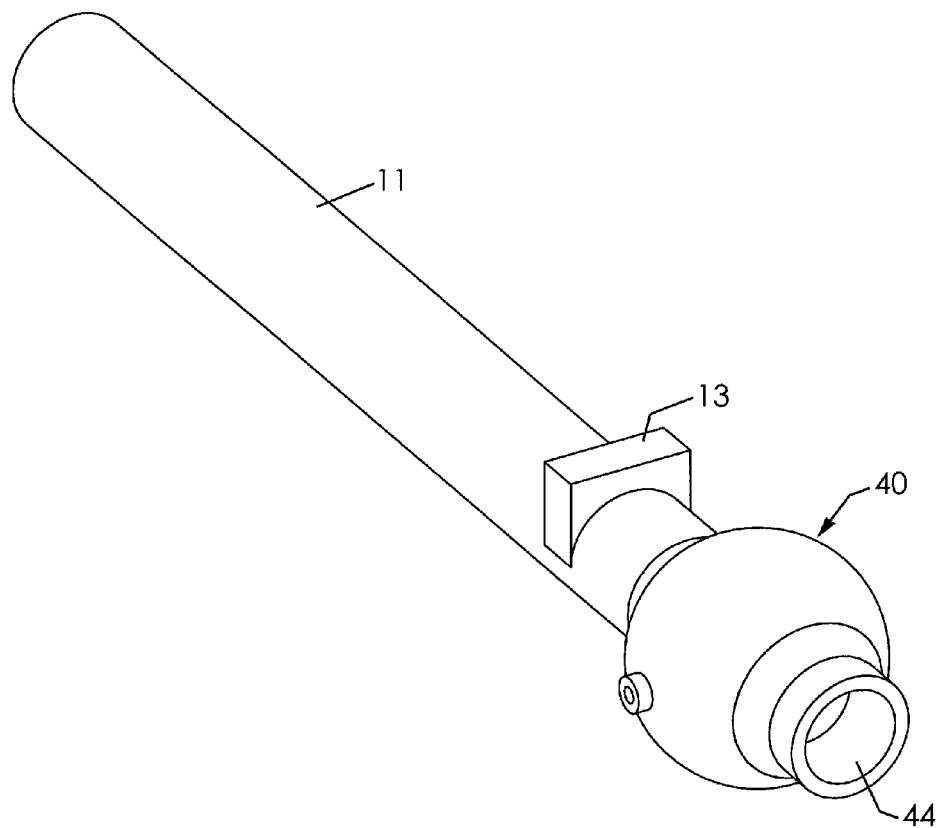
FIG. 11 is a perspective view of the valve assembly and conduit with the housing removed.
Figure 12A:
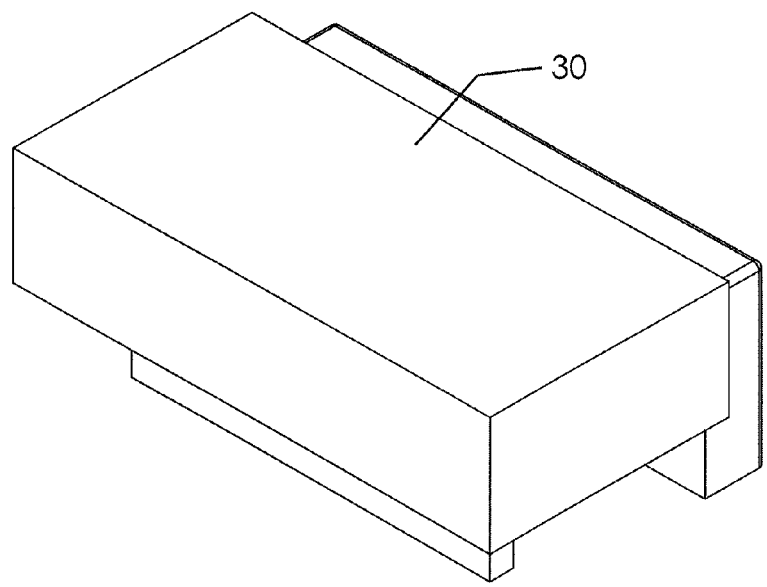
FIG. 12a is an isolated perspective view of the electromagnet as in FIG. 2b.
Figure 12B:
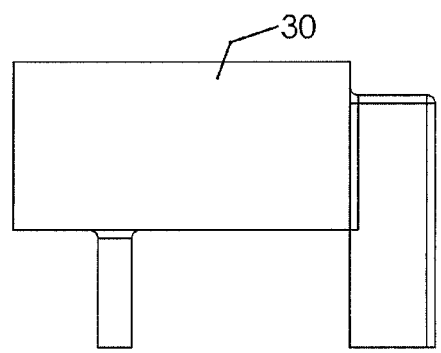
Figure 13A:
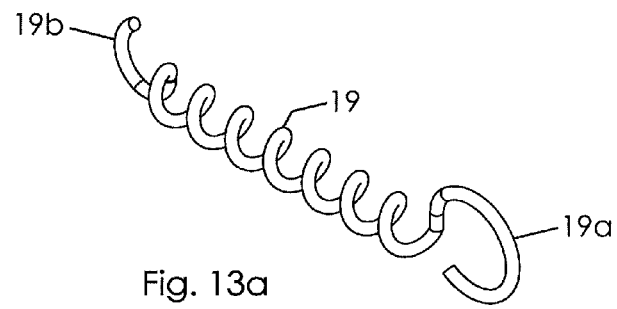
FIG. 13a is a perspective view of a tension spring as in FIG. 2b illustrated in an extended or stretched configuration.
Figure 13B:
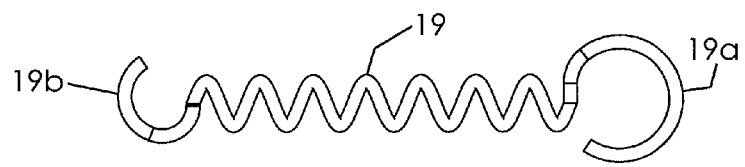
Figure 14A:
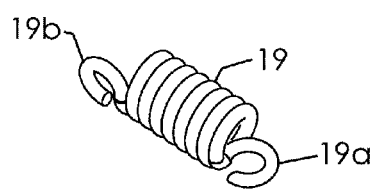
FIG. 14a is a perspective a tension spring as in FIG. 2b illustrated in an unextended or relaxed configuration.
Figure 14B:
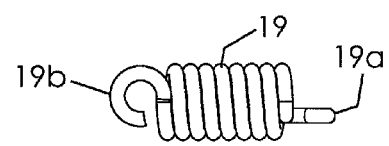
Figure 15A:
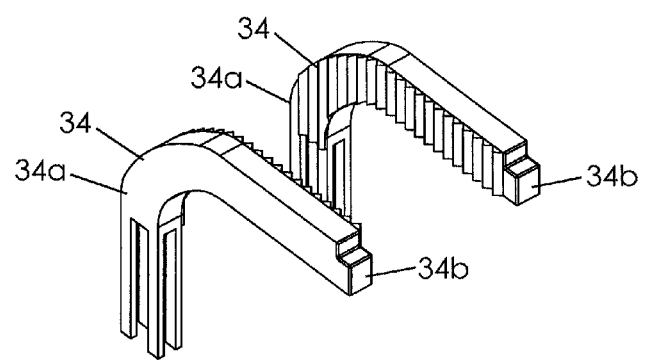
FIG. 15a is a perspective view of the rails as in FIG. 2b.
Figure 15B:
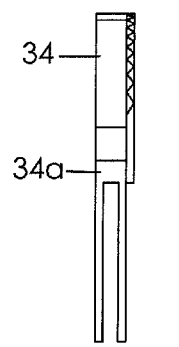
Figure 15B:
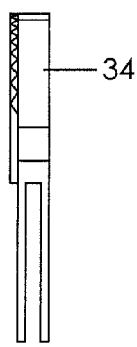
Figure 15C:
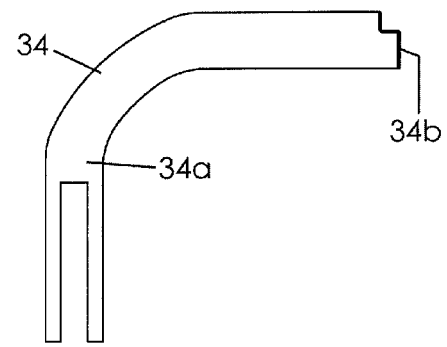
Figure 16:
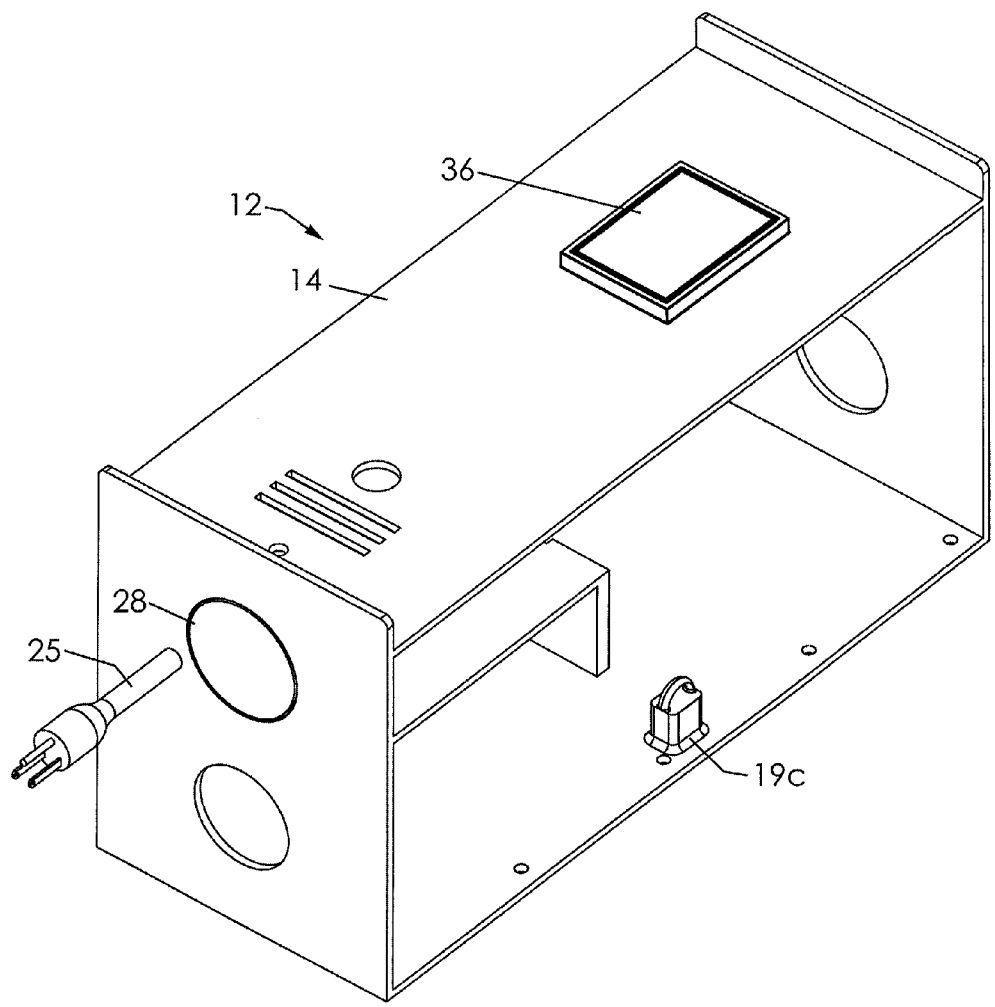
FIG. 16 is a perspective view of he housing as in FIG. 2a viewed from another angle and with internal components and respective side panels removed for clarity.
Figure 17:
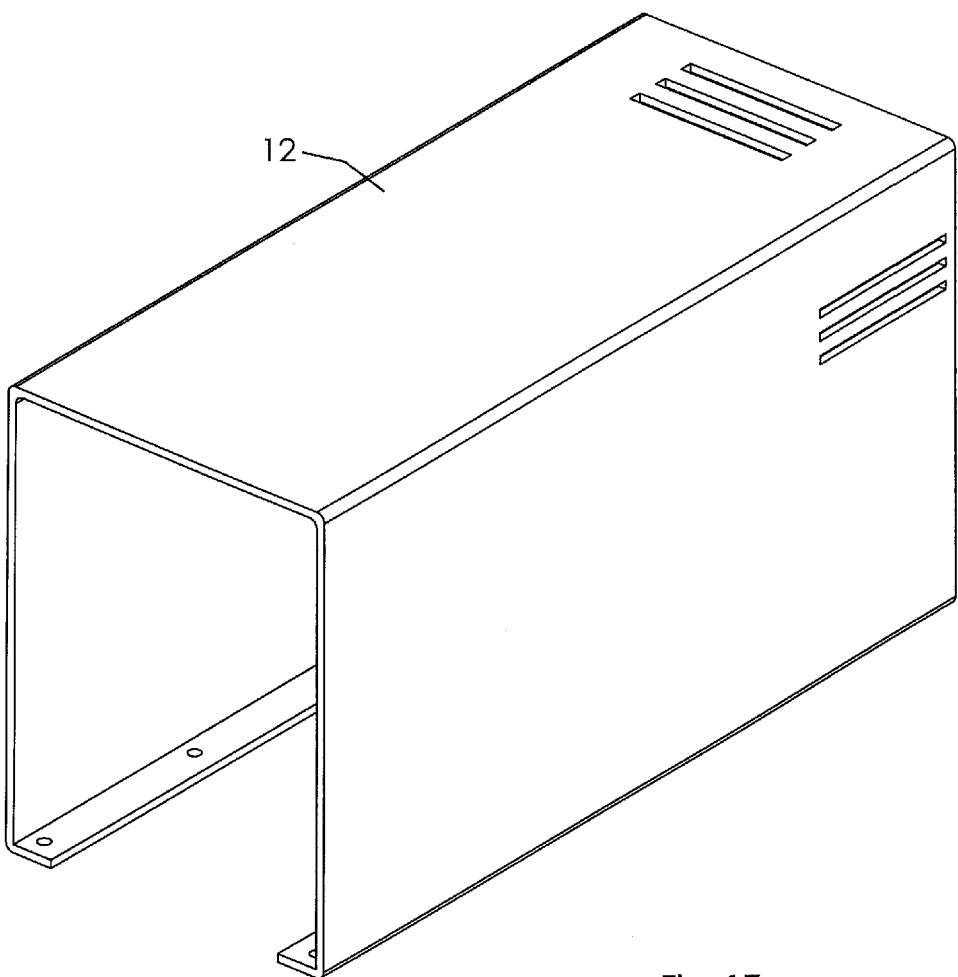
FIG. 17 is a perspective view of the housing of the apparatus as in FIG. 1.

More particularly, each rail 34 has a lower end 34a positioned adjacent the stop 13 (where the second lever portion 18 is situated when the closure assembly 16 is in a released configuration) and an upper end 34b positioned adjacent the electromagnet 30 (FIGS. 2a and 2b). The rails 34 have a curved configuration specifically complementary to the path that the closure assembly 16 takes when pivotally moved relative to the valve assembly housing 12. The pair of rails 34 is electrically connected to the processor 22 and receives current from the main power supply as directed by the processor 22. Therefore, when the rails 34 are energized, they "draw" or incrementally urge the second lever portion 18 into contact with the electromagnet 30 and the magnetic connection is made.

In another aspect, the apparatus 10 may include a digital input and display device 36 mounted to the framework 14 within the housing 12 and is in data communication with the processor 22. In one embodiment, the display and input device may be a single component although they may be separate components in others. The input and display device 36 may utilize touch screen technology so that a user may enter instructions to the processor 22. In addition, the processor 22 will direct data to be displayed on the input and display device 36 and, in some cases, solicit further instructions. Specific routines that involve the input and display device 36 will be discussed later.

Figure 18:
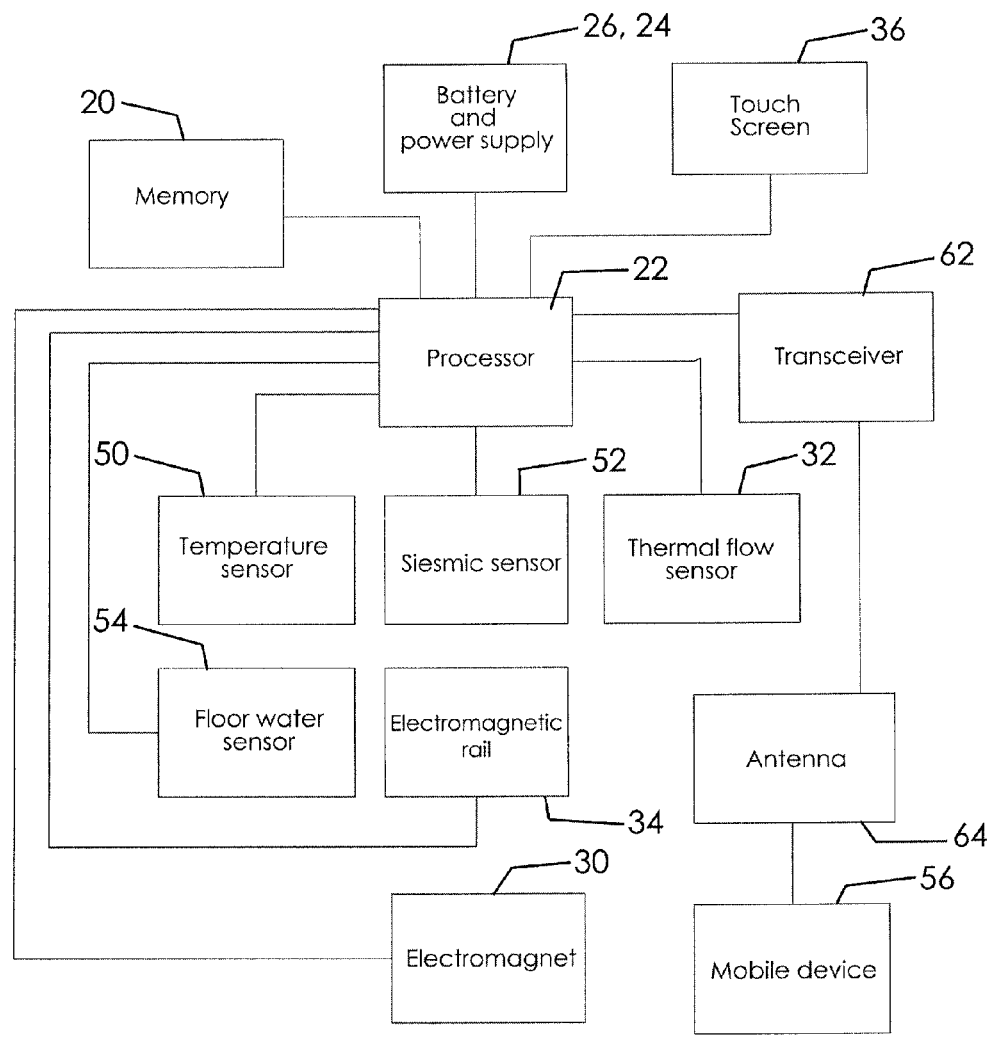
FIG. 18 is a block diagram illustrating the electrical and electronic components of the invention.

In still another aspect, the apparatus 10 may include a communications module 60 configured to transmit and receive data signals from a wireless device, such as a cell phone 56. It is understood that the cell phone may be running a mobile application specifically configured to interact with the communications module 60 of the instant apparatus 10. The communications module 60 may include a transceiver 62 for transmitting and receiving data. It is understood, of course, that a separate transmitter and separate receiver may also be implemented (FIG. 18). The communications module 60 may include an antenna 64 positioned in the housing 12 and configured to enhance the signals transmitted by the transceiver 62 and to more effectively receive signals returning from a user's wireless device. Routines making use of the communications module 60 as will be described more fully later.

The fluid flow apparatus 10 includes multiple sensors that detect various conditions related to the environment in and surrounding the apparatus 10. An exemplary process 100 making use of sensor data will be described below in more detail. The fluid flow sensor 32 has been described previously and may be first utilized to establish flow history record and then to determine current flow data for comparison to the flow history record. In addition, a temperature sensor 50 may be positioned in the housing 12, such as by being mounted to the framework 14. The temperature sensor 50 is in data communication with the processor 22. The processor 22, when actuated by programming instructions, is configured to actuate the closure assembly 16 to move the valve assembly 40 to a closed configuration if a predetermined low temperature is reached.

Still further, a seismic sensor 52 is coupled to the framework 14 and is in data communication with the processor 22. The processor 22 is configured to actuate the closure assembly 17 to move the valve assembly 40 to a closed configuration if a predetermined amount of seismic activity indicative of an earthquake is detected by the seismic sensor 52. In addition, a floor water sensor 54 is in data communication with the processor 22 but may be positioned on the floor proximate the housing 12. For instance, if the floor of a basement or house to which the housing 12 is mounted is filling up with water, the floor water sensor 54 may detect the rising waters and indicate this condition to the processor 22 such that the processor 22 can actuate the valve assembly 40 to move to the closed configuration and to actuate additional warnings, such as to transmit a message to the homeowner or law enforcement.

In an embodiment, the processor 22 may be in data communication with other appliances and systems in the residential environment. More particularly, the processor 22 may be connected to a heating, ventilation, and air conditioning ("HVAC") system, hot water heater, refrigerator, or other appliance to which water is supplied. Correspondingly, there may be programming in memory 20 regarding "normal" readings for each auxiliary device or system to which current sensory readings may be compared. Or, a record of normal readings may be developed through monitoring over time. When a potential problem is detected, the homeowner may be notified via the communications module 60 described above. Then, the homeowner may have opportunity to direct a closure of the valve assembly or to take no action at all. Or, the processor 20 may direct closure of the valve based on predetermined conditions if the home owner does not respond in a predetermined amount of time.

Figure 19:
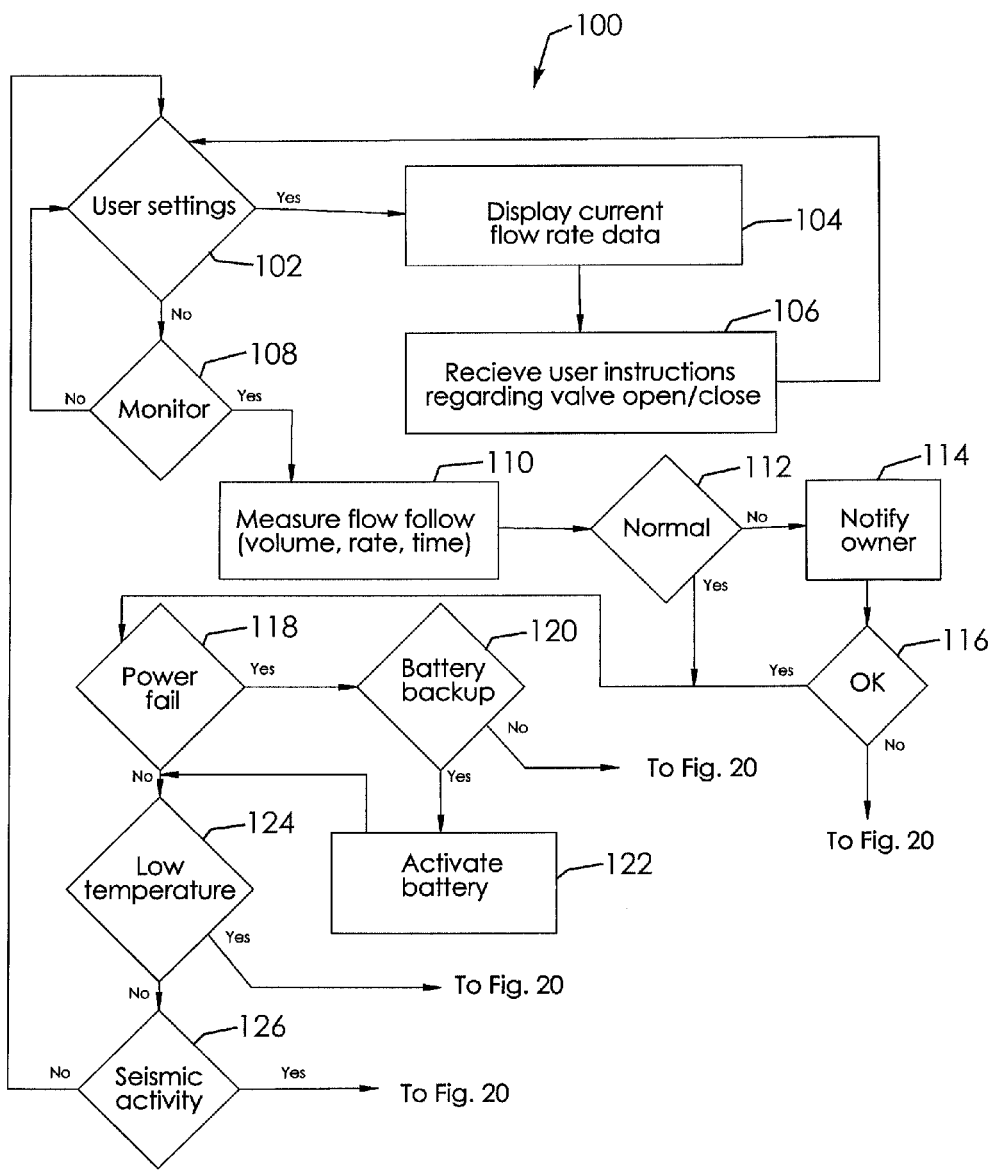
FIG. 19 is a flowchart illustrating the logic steps of a routine for monitoring operation of the fluid flow apparatus according to the present invention.
Figure 20:
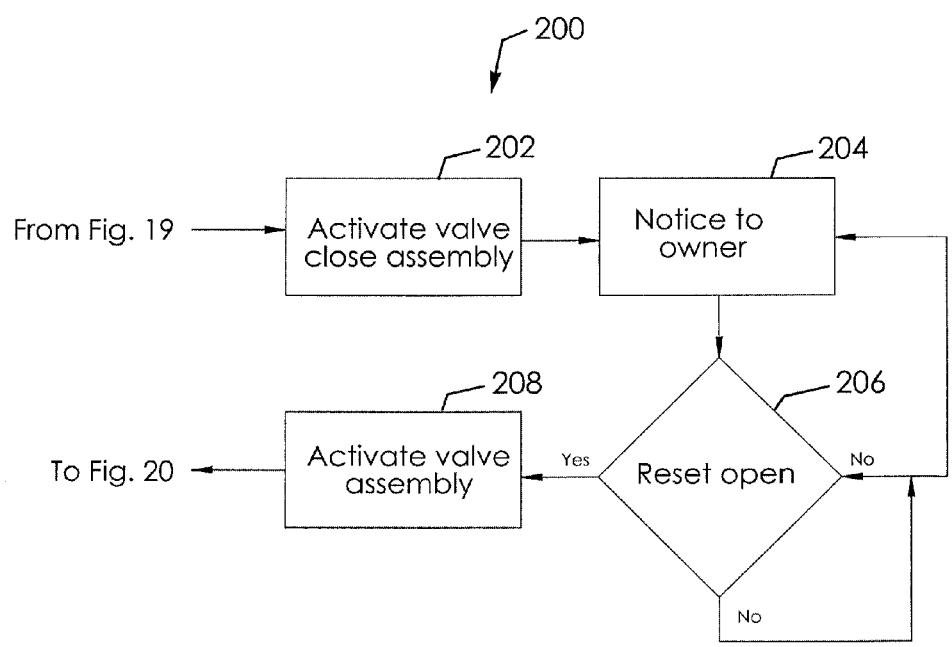
FIG. 20 is a flowchart illustrating the logic steps of a routine for closing and opening the valve assembly of the apparatus of the present invention.

An exemplary process 100 of operation of the fluid flow apparatus 10 will now be described with reference to FIGS. 19 and 20. At step 102, the processor 22 determines is a user desires to enter setup data, such as communications data, flow rate controls, safe temperature of operation, or other instructions. The user may indicate such a desire using the input and display device 36. If so, the process 100 proceeds to step 104, where current flow rate data may be displayed. Otherwise, the process 100 proceeds to step 108. The process 104 may then proceed to step 106 where specific user instructions regarding control of the valve assembly 40, timing and conditions for valve closure, communications information, and other settings depending on the implementation. The resident may even instruct the valve assembly to close at a predetermined time or immediately, such as the resident is leaving on an extended vacation. The process then proceeds to step 108. At the time of initial setup, it is understood that the apparatus 10 may perform an initial flow rate record. Specifically, the fluid flow sensor 32 is monitored for a predetermined period of time to establish normal flow rate patterns. For instance, the flow rate of water flowing through the conduit 11 may be monitored for velocity for a predetermined time or even continuously or the like and this measured data may be stored in memory as a "flow history record." This data would be considered a "normal" flow history that can later be compared with current flow rates that may indicate a problem as will be described below. The same type of monitoring may be implemented with regard to an integrated HVAC system, water heater, sump pump, or the like as described above.

At step 108, the processor 22 determines if a user wishes the apparatus 10 to entering a monitoring mode—which is the normal operational mode of the system. If so, process 100 proceeds to 110; otherwise, process 100 proceeds to step 102. At step 110, the processor 22 directs the fluid flow sensor 32 to measure fluid flow (such as measuring velocity, rate, time). Process 100 proceeds to step 112 where it is compared with previously stored flow rate data, i.e. the flow history record. If the processor 22 determines that the current flow data is "normal" (meaning, within predetermined variance ranges), then the process 100 proceeds to step 118. Otherwise, process 100 proceeds to step 114 where a user, such as a home owner, is notified that the flow rate is abnormal and there may be a problem, such as a water leak, an obstruction, or other problem.

Process 100 may cause the user to be notified by directing the communications module 60 to send a text, email, mobile application, or pre-recorded or synthesized voice message. Process 100 then proceeds to step 116 where the processor 22 determines if the user wishes the apparatus 10 to simply carry on with no further action or to actually close the valve assembly as a precaution. If the communications module 60 receives a message that all is "ok" to take no action, then process 100 proceeds to step 118. However, if the user signals to close the valve or simply does not respond after a predetermined amount of time, process 100 proceeds to process 200 illustrated in FIG. 20. It is understood that the user may direct via the mobile app to close the valve even if there is no problem detected. The mobile app may further include programming to open the valve if it is closed.

At step 118, the processor 22 determines if there has been a main power failure to the apparatus, e.g. the usual AC power source has been interrupted. It is understood that the processor 22 may still be functioning via the backup battery 26. If a power failure is detected, then process 100 proceeds to step 120; otherwise, process 100 proceeds to step 124. At step 120, the processor 22 determines if the backup battery has failed or is within a predetermined range of potential failure; if so, then the process 100 proceeds to process 200 illustrated in FIG. 20. Otherwise, the process 100 proceeds to step 122 where it directs the backup battery 26 to provide current to all or a limited set of electrical operations of the apparatus 10. Process 100 then proceeds to step 124.

At step 124, the processor 22 determines if the temperature sensor 50 is indicative of a temperature below a predetermined safe temperature and, if so, process 100 proceeds to process 200 so as to close the valve 42. Otherwise, temperature is deemed acceptable and process 100 proceeds to step 126.

At step 126, the processor 22 determines if the seismic sensor 52 is indicative of a detection of seismic activity above predetermined safe level and, if so, process 100 proceeds to process 200 so as to close the valve 42. Similarly, the processor 22 may determine if the wet floor water sensor 54 is indicative of standing or increasing water levels and, if so, may proceed to process 200, notify a user via the communications module, or the like. Process 100 may then revert to step 108 to continue monitoring or to step 100 to provide the user with an option to set user controls or monitor. In other words, the input and display device 36 may normally display a menu of action choices.

Process 200 is directed to a routine for moving the valve assembly 40 between open and closed configurations. At step 202, the processor 22 directs the closure assembly 16 operate to move the valve assembly 40 to the closed configuration, such as be de-energizing the electromagnet 30 to release the second lever portion 18, as described above. Process 200 then proceeds to step 204, where notice is made to a user, such as the home owner via the communications module 60 as described above. It is understood that the notice to the homeowner may include details of what condition was the reason for triggering a closure action. Process 200 then proceeds to step 206.

At step 206, the processor 22 determines if the valve assembly 40 should be re-opened, such because the homeowner has directed such an action or the triggering condition has been resolved, or another predetermined reason. If so, process 200 continues to step 208; otherwise, the process cycles again to step 206. At step 208, the processor 22 directs the valve assembly 40 be re-opened. It is understood that a re-opening includes electrical activation of the plurality of rails 34 so as to urge the closure assembly 16 into magnetic contact with the electromagnet 30 as described above. Process 200 then returns to process 100 illustrated in FIG. 19 where the system may again be monitored.

It is understood that while certain forms of this invention have been illustrated and described, it is not limited thereto except insofar as such limitations are included in the following claims and allowable functional equivalents thereof.

The invention claimed is:

1. An integrated fluid flow apparatus for managing the flow of a fluid through a conduit, comprising:
   a housing operatively coupled to the conduit;
   a fluid flow sensor situated in said housing and connected to a power source, said fluid flow sensor configured to determine a velocity of a fluid flowing through the conduit;
   a valve assembly positioned inline with the conduit, said valve assembly defining an inlet, an outlet, and an interior area therebetween, said valve assembly being movable between an open configuration that allows the fluid to flow through said outlet of said valve assembly and a closed configuration that prevents the fluid from flowing through said outlet;
   an electromagnet electrically connected to and selectively energized by the power source and situated proximate said valve assembly;
   a closure assembly having a first lever portion operatively coupled to said valve assembly and a second lever portion extending away from said valve assembly and selectively magnetically connected to said electromagnet;
   wherein said closure assembly holds said valve assembly at said open configuration when said second lever portion is magnetically connected to said electromagnet and moves said valve assembly to said closed configuration when said second lever portion is magnetically released from said electromagnet;
   wherein said closure assembly includes a spring having a first end coupled to said housing and an opposed second end coupled to said second lever portion, said spring being positioned and normally biased to pull said second lever portion away from said electromagnet;
   wherein said spring is configured such that said first lever portion automatically pulls said second lever portion away from said electromagnet and, as a result, to move said valve assembly to said closed configuration when said electromagnet is not energized.

2. The fluid flow apparatus as in claim 1, wherein:
   said second lever portion is magnetically coupled to said electromagnet so long as said electromagnet is energized by said power source;
   wherein said valve assembly is at said open configuration when said second lever portion is electromagnetically coupled to said power source.

3. The fluid flow apparatus as in claim 2, wherein said spring is a tension spring.

4. The fluid flow apparatus as in claim 3, wherein:
   said valve assembly includes a ball valve housing situated inline with the conduit;
   said valve is a ball valve that is positioned inside the interior area of the valve assembly and selectively moved by said closure assembly between respective open and closed configurations.

5. The fluid flow apparatus as in claim 1, further comprising a magnetic rail situated in the housing and, when energized, is configured to magnetically urge said second lever portion of said closure assembly from a released configuration displaced from said electromagnet to a connected configuration in magnetic contact with said electromagnet.

6. The fluid flow apparatus as in claim 1, further comprising:
   a memory having data structures configured to store data and programming instructions;
   a processor in data communication with said fluid flow sensor and with said memory;
   programming in memory that, when executed by said processor, causes said processor to selectively actuate said closure assembly to move said valve assembly to said closed configuration.

7. The fluid flow apparatus as in claim 6, further comprising programming in memory that, when executed by said processor, causes said processor to:
   actuate said fluid flow sensor to track velocity and time for one of a predetermined period of time or continuously;
   store said tracked data in said memory as a "flow history record";
   actuate said fluid flow sensor to measure a current velocity and time associated with a current fluid flow in the conduit;
   compare said measured current velocity and time with said flow history record;
   actuate said closure assembly to move said valve assembly to said closed configuration if said comparison exceeds a predetermined variance.

8. The fluid flow apparatus as in claim 7, further comprising:
   a communications module in data communication with said processor that is configured to selectively transmit data to and receive data from a wireless device;
   programming in memory that, when executed by said processor, causes said processor to actuate said communications module to transmit said measured current velocity and time data to a user-determined wireless device if said predetermined variance is exceeded.

9. The fluid flow apparatus as in claim 8, further comprising programming in memory that, when executed by said processor, causes said processor to:
   actuate said communications module to receive input data from a user via a wireless device;
   actuate said closure assembly to move said valve assembly to said closed configuration if said received input data is indicative of an instruction to move said closure assembly to said closed configuration.

10. The fluid flow apparatus as in claim 6, further comprising:
    a temperature sensor situated in said housing and configured to generate temperature data;
    programming in memory that, when executed by said processor, causes said processor to actuate said closure assembly to move said valve assembly to said closed configuration if said temperature data is below a predetermined temperature.

11. The fluid flow apparatus as in claim 6, further comprising:
    a seismic activity sensor situated in said housing and configured to generate seismic data;
    programming in memory that, when executed by said processor, causes said processor to actuate said closure assembly to move to said valve assembly to said closed configuration if said seismic data has exceeded a predetermined quantity.

12. The fluid flow apparatus as in claim 6, further comprising:
    a communications module in data communication with said processor that is configured to selectively transmit data to and receive data from a wireless device;

programming in memory that, when executed by said processor, causes said processor to actuate said communications module to transmit a notice to a user indicative that said closure assembly has moved to a closed configuration due to a low temperature.

13. The fluid flow apparatus as in claim 6, further comprising:
a communications module in data communication with said processor that is configured to selectively transmit data to and receive data from a wireless device;
programming in memory that, when executed by said processor, causes said processor to actuate said communications module to transmit a notice to a user indicative that said closure assembly has moved to a closed configuration due to excessive seismic activity.

14. The fluid flow apparatus as in claim 6, further comprising:
an input device coupled to said housing and in data communication with said processor that is configured to receive input data from a user and communicate said input data to said processor;
a display coupled to said housing and in data communication with said processor that is configured to publish data to a user and solicit input data from the user.

15. The fluid flow apparatus as in claim 8, wherein said communication module includes:
a transceiver in data communication with said processor that is configured to selectively transmit and receiver data signals relative to a wireless device;
an antenna electrically coupled to said transceiver and configured to strengthen respective transmitted and received signals.

16. The fluid flow apparatus as in claim 1, wherein said power source includes a backup battery situated in said housing and electrically connected to said processor.

17. The fluid flow apparatus as in claim 3, further comprising:
a memory having data structures configured to store data and programming instructions;
a processor in data communication with said fluid flow sensor and with said memory;
programming in memory that, when executed by said processor, causes said processor to selectively actuate said closure assembly to move said valve assembly to said closed configuration.

18. The fluid flow apparatus as in claim 17, further comprising programming in memory that, when executed by said processor, causes said processor to:
actuate said fluid flow sensor to track velocity and time for one of a predetermined period of time or continuously;
store said tracked data in said memory as a "flow history record";
actuate said fluid flow sensor to measure a current velocity and time associated with a current fluid flow in the conduit;
compare said measured current velocity and time with said flow history record;
actuate said closure assembly to move said valve assembly to said closed configuration if said comparison exceeds a predetermined variance.

19. The fluid flow apparatus as in claim 18, further comprising:
a communications module in data communication with said processor that is configured to selectively transmit data to and receive data from a wireless device;
programming in memory that, when executed by said processor, causes said processor to actuate said communications module to transmit said measured current velocity and time data to a user-determined wireless device if said predetermined variance is exceeded.

20. The fluid flow apparatus as in claim 19, further comprising programming in memory that, when executed by said processor, causes said processor to:
actuate said communications module to receive input data from a user via a wireless device;
actuate said closure assembly to move said valve assembly to said closed configuration if said received input data is indicative of an instruction to move said closure assembly to said closed configuration.

21. An integrated fluid flow apparatus for managing the flow of a fluid through a conduit, comprising:
a housing operatively coupled to the conduit;
a fluid flow sensor situated in said housing and connected to a power source, said fluid flow sensor configured to determine a velocity of a fluid flowing through the conduit;
a memory having data structures configured to store data and programming instructions;
a processor in data communication with said fluid flow sensor and with said memory;
a valve assembly positioned inline with the conduit, said valve assembly defining an inlet, an outlet, and an interior area therebetween, said valve assembly being movable between an open configuration that allows the fluid to flow through said outlet of said valve assembly and a closed configuration that prevents the fluid from flowing through said outlet;
an electromagnet electrically connected to and selectively energized by the power source and situated proximate said valve assembly;
wherein said closure assembly includes a first lever portion operatively coupled to said valve assembly and a second lever portion extending away from said valve assembly and selectively magnetically connected to said electromagnet and operated by instructions from the processor;
wherein said closure assembly is configured to hold said valve assembly at said open configuration when said second lever portion is magnetically connected to said electromagnet and moves said valve assembly to said closed configuration when said second lever portion is magnetically released from said electromagnet;
wherein said closure assembly includes a spring having a first end coupled to said housing and an opposed second end coupled to said second lever portion, said spring being positioned and normally biased to pull said second lever portion away from said electromagnet;
wherein said spring is configured such that said first lever portion automatically pulls said second lever portion away from said electromagnet and, as a result, to move said valve assembly to said closed configuration when said electromagnet is not energized.

22. The fluid flow apparatus as in claim 21, wherein:
said second lever portion is magnetically coupled to said electromagnet so long as said electromagnet is energized by said power source;
wherein said valve assembly is at said open configuration when said second lever portion is electromagnetically coupled to said power source.

23. The fluid flow apparatus as in claim 21, further comprising programming in memory that, when executed by said processor, causes said processor to:
actuate said fluid flow sensor to track velocity and time for one of a predetermined period of time or continuously;

store said tracked data in said memory as a "flow history record";

actuate said fluid flow sensor to measure a current velocity and time associated with a current fluid flow in the conduit;

compare said measured current velocity and time with said flow history record;

actuate said closure assembly to move said valve assembly to said closed configuration if said comparison exceeds a predetermined variance.

24. The fluid flow apparatus as in claim 23, further comprising:

a communications module in data communication with said processor that is configured to selectively transmit data to and receive data from a wireless device;

programming in memory that, when executed by said processor, causes said processor to actuate said communications module to transmit said measured current velocity and time data to a user-determined wireless device if said predetermined variance is exceeded.

25. The fluid flow apparatus as in claim 24, further comprising programming in memory that, when executed by said processor, causes said processor to:

actuate said communications module to receive input data from a user via a wireless device;

actuate said closure assembly to move said valve assembly to said closed configuration if said received input data is indicative of an instruction to move said closure assembly to said closed configuration.

26. The fluid flow apparatus as in claim 21, further comprising:

a temperature sensor situated in said housing and configured to generate temperature data;

programming in memory that, when executed by said processor, causes said processor to actuate said closure assembly to move said valve assembly to said closed configuration if said temperature data is below a predetermined temperature.

27. The fluid flow apparatus as in claim 21, further comprising:

a seismic activity sensor situated in said housing and configured to generate seismic data;

programming in memory that, when executed by said processor, causes said processor to actuate said closure assembly to move to said valve assembly to said closed configuration if said seismic data has exceeded a predetermined quantity.

28. The fluid flow apparatus as in claim 21 further comprising a magnetic rail situated in the housing and, when energized, is configured to magnetically urge said second lever portion of said closure assembly from a released configuration displaced from said electromagnet to a connected configuration in magnetic contact with said electromagnet.

29. The fluid flow apparatus as in claim 28, wherein said rail includes a lower end positioned adjacent a stop displaced from said electromagnet and an upper end positioned adjacent the electromagnet, said rail configured to urge movement of said second lever portion to move from said lower end to said upper end when said rail is energized.

* * * * *